United States Patent [19]

Krapf

[11] 4,386,475
[45] Jun. 7, 1983

[54] SCHEDULING BOARD OVERRIDER SYSTEM

[76] Inventor: Wallace A. Krapf, 25 Berkeley St., Rochester, N.Y. 14607

[21] Appl. No.: 343,226

[22] Filed: Jan. 27, 1982

[51] Int. Cl.$^3$ ........................................... B42F 17/06
[52] U.S. Cl. ...................................... 40/373; 434/108
[58] Field of Search ...................... 434/107, 108, 430; 40/371, 373, 352, 354, 512

[56] References Cited

U.S. PATENT DOCUMENTS

| | | | |
|---|---|---|---|
| 1,587,866 | 6/1926 | Whitmore | 40/352 |
| 1,790,127 | 1/1931 | Whitcomb | 434/430 |
| 1,881,102 | 10/1932 | Sperling | 40/352 |
| 2,080,975 | 5/1937 | Welk et al. | 40/352 |
| 2,168,793 | 8/1939 | Dobbin | 434/430 |
| 2,234,249 | 3/1941 | Hanford | 434/108 |
| 2,706,348 | 4/1955 | Johnson | 434/107 |

*Primary Examiner*—Gene Mancene
*Assistant Examiner*—Wenceslao J. Contreras
*Attorney, Agent, or Firm*—Stonebraker, Shepard & Stephens

[57] ABSTRACT

My invention provides a movable overrider system for moving a reference element board 15r over the front faces of track-supported module boards 15 of a modular scheduling board system 10. An upper wall track 12 supports a trolley bracket 20 that carries a pair of wheels 21 engaging a retainer lip 17 and resting on a path 14 of the upper wall track 12, while lower track 11 supports boards 15. Holders 25 on the lower edge 24 of trolley bracket 20 hold the back of the reference element board 15r to hang downward from the trolley bracket. Holders 25 and bracket 20 are dimensioned to suspend reference board 15r at the same vertical level as track-supported boards 15 so that reference board 15r can roll along the length of tracks 11 and 12 and override the track-supported boards while staying in horizontal alignment.

6 Claims, 8 Drawing Figures

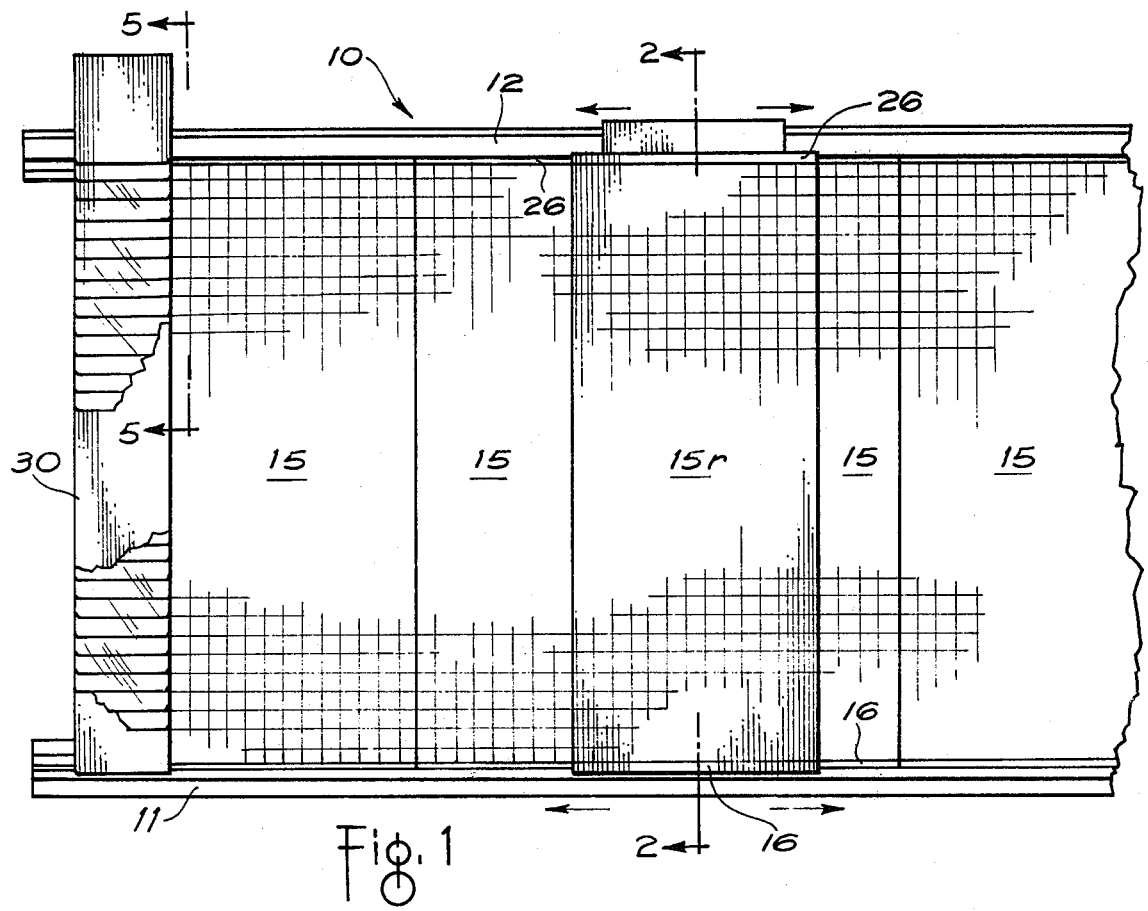
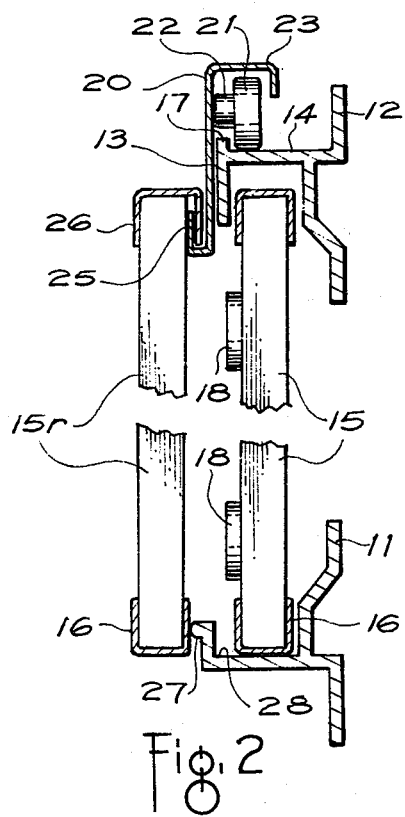
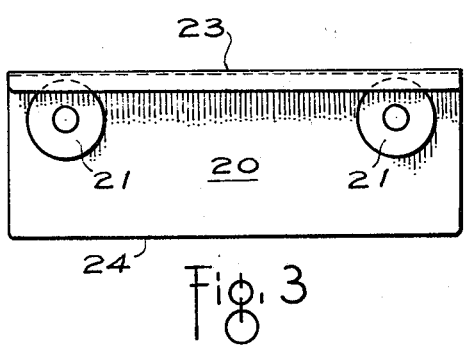
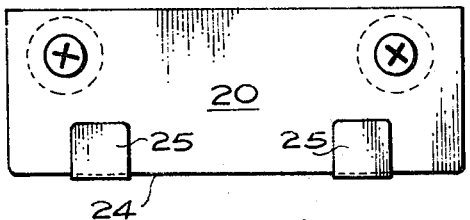

SCHEDULING BOARD OVERRIDER SYSTEM

BACKGROUND

Scheduling board systems using movable boards mounted on wall tracks are increasingly used for displaying information and scheduling people, events, and operations. Such scheduling board systems vary in detail but typically include upper and lower wall tracks that support movable module boards resting on the lower track and removably retained in a vertical position by the upper track. Such module boards can be moved along the wall tracks, and removed from and rearranged on the wall tracks. Modular boards are also typically provided with a grid pattern and are often made of ferro magnetic material to support magnetic tags, names, and symbols, that can be rearranged for scheduling and display purposes.

This invention involves recognition of the need of supporting module boards and other accessories so they can override the boards supported on the wall tracks. A modular board or other element overriding the track-supported module boards becomes a reference element that can move along the tracks in front of the track-mounted boards for more convenient reading, scheduling, revision, note taking, etc. An overriding reference element is especially useful as modular board scheduling systems increase in length and capacity. For example, a vertical index at the left end of the board is difficult to read relative to a grid pattern on modular boards many feet to the right of the index. An overriding reference element can move a vertical index along the length of the scheduling board system to eliminate this problem. Overriding reference elements can also serve other purposes such as displaying information that can be compared with the underlying information on the scheduling system, providing a movable note or memoranda board, facilitating the mounting, arranging, and revising of schedule information, and other uses that will evolve as overrider reference elements become available.

SUMMARY OF THE INVENTION

This invention applies to a modular scheduling board system having upper and lower wall tracks supporting movable module boards that rest on the lower track and are removably retained in a vertical position by the upper track. It provides a movable overrider system for moving a reference element over the front faces of the track-supported module boards.

To do this it uses a generally vertically oriented trolley bracket that carries a pair of wheels mounted on and spaced from the trolley bracket. The upper wall track has a smooth path for receiving the trolley bracket wheels, and a retainer lip along the front edge of the upper track extends into the space between the wheels and the trolley bracket when the wheels are on the path. This makes the wheels engage the retainer lip and rest on the path to support the trolley bracket for rolling along the upper track while extending downward over the front face of the upper track.

The lower edge of the trolley bracket has a holder formed to engage the back of one of the module boards selected to serve as a reference element and to hold the reference element board to hang downward from the trolley bracket. The holder and bracket are dimensioned to suspend the reference board at the same vertical level as the track-supported boards so that the reference board can be moved along the length of the tracks to override the track-supported boards while staying horizontally aligned with the track-supported boards. The lower wall track has a lip extending forward along its upper forward edge to engage the back of the trolley-supported reference board and space the reference board clear of the fronts of the track-supported boards. The trolley bracket can also be adapted to support reference elements other than a module board, such as a vertically oriented reference bar or panel.

DRAWINGS

FIG. 1 is a fragmentary front elevational view of a preferred embodiment of the inventive scheduling board overrider system;

FIG. 2 is an enlarged, fragmentary cross-sectional view of the overrider system of FIG. 1 taken along the line 2—2 thereof;

FIGS. 3 and 4 are respectively rear and front elevational views of the trolley bracket used in the embodiment of FIGS. 1 and 2;

DETAILED DESCRIPTION

Figure 5:
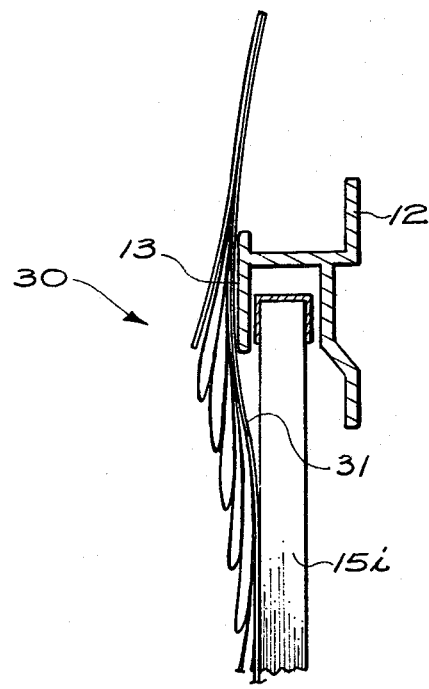
FIG. 5 is an enlarged fragmentary cross-sectional view of the embodiment of FIG. 1 taken along the line 5—5 thereof.

As scheduling board systems become larger and more complex, I have discovered that an overrider system to move a reference element over the front faces of a series of track-supported boards has many advantages. Structuring such an overrider system to achieve these advantages in a convenient and practical way and at a moderate cost has been difficult, however. The overriding reference element must stand clear of the track-supported boards so that it can be moved along quickly without interference from information magnetically mounted on the front faces of the track-supported boards. The reference element must also stay horizontally aligned with the track-supported module boards so that the reference element information stays aligned with the grid work on the boards. Then although reference elements of many different types are desirable, it is prohibitively expensive to fabricate reference elements separately and independently for many different uses. So a practical solution requires modular adaptation allowing the same module boards that can be track mounted to also be arranged as overriding reference elements. My solution meets all these requirements and has other advantages as explained below.

The inventive overrider system applies to a scheduling board system 10 such as shown in FIG. 1. The basic scheduling or information display board system 10 typically includes a lower track 11 supporting modular boards 15 and an upper track 12 retaining modular boards 15 removably in a vertical position. Boards 15 can be moved along and positioned lengthwise of tracks 11 and 12 and can be removed from tracks 11 and 12 by lifting upward to clear the bottom of a module board 15 from lower track 11 and then moving the board outward from between the tracks.

Module boards 15 are usually formed of ferromagnetic material for holding magnetized markers, names, symbols, etc., but they can also be made of other materials and display information in other ways. System 10 can be made in indefinite lengths and can even extend around corners to display considerable information. Module boards 15 also typically have a grid pattern and are made so that their grids align horizontally when the bottoms of the boards rest in lower track 11.

This invention allows one of the module reference boards 15 to be selected for use as a reference element 15r and mounted to move along over the front surfaces of the track-supported boards 15 in an overrider fashion. Then reference information including indexes or other matter mounted on board 15r can be moved along the length of tracks 11 and 12 while maintained in horizontal alignment with the grids on track-supported boards 15. My preferred way of accomplishing this is shown in FIGS. 2-4.

Generally, a trolley bracket 20 rolls along upper track 12 and supports reference board 15r for overrider use by cooperating with other elements in the system and meeting several requirements. Trolley bracket 20 is preferably formed of sheet metal in a shape shown in FIGS. 2-4. It extends vertically downward over the front face 13 of upper track 12 and it rolls along a smooth path 14 formed along an upper surface of upper track 12. To do this, trolley bracket 20 carries a pair of wheels 21 spaced from bracket 20 by the thickness of spacers 22. A retainer lip 17 extends upward along the forward edge of upper track 12 adjacent wheel path 14 and fits into the space between bracket 20 and wheels 21 adjacent spacer 22. This allows wheels 21 to roll along wheel path 14 while engaging retainer lip 17 to stay securely on upper track 12 without risk of falling off. It also accomplishes this with a simple and convenient structure that allows trolley bracket 20 to be lifted off of upper track 12 whenever desired.

The top 23 of trolley bracket 20 bends over and protects wheels 21, and the bottom 24 of bracket 20 has holders 25 preferably formed as bent up tabs properly positioned to support module reference boards 15r. My preferred way of doing this is to provide each module board 15 with an upper frame channel 26 and a lower frame channel 16 covering respectively the top and bottom edges of each board 15. Any one of the boards can then be selected as a reference element and mounted on trolley bracket 20 by sliding holder tabs 25 up under the back edge of frame channel 26. Bracket 20 and holder tabs 25 are dimensioned relative to upper frame channel 26 of boards 15 so that any board 15r selected as a reference element and mounted with its upper channel 26 fitting over holder tabs 25 is held at the same elevational height as track-supported boards 15 with their lower channels 16 resting on bottom track 11. This accurately aligns the grid of the reference overrider board 15r with the grids of the track-supported boards 15.

Bracket 20 supports the weight of reference board 15r by its interlocking grip with upper channel 26 so that board 15r hangs dependently from bracket 20. Holder tabs 25 of bracket 20 also space the upper edge of reference board 15r outward from the front surfaces of track-supported boards 15 sufficiently to clear magnetic markers 18 on the front surfaces of boards 15. Bracket 20 also guides along the front face 13 of upper track 12 where retainer lip 17 keeps wheels 21 reliably on course.

To keep the bottom of reference board 15r clear of the overriden track boards 15, lower track 11 has a lip 27 extending forward to engage the bottom frame channel 16 of reference board 15r and space it forward of track boards 15 for adequate clearance. Lip 27 is spaced slightly above surface 28 that supports bottom channels 16 of track-supported boards 15, and in this position lip 27 engages bottom channel 16 of reference board 15r at the same elevation as the bottom channel of track boards 15.

Any module board 15 can serve as a reference board 15r by quickly and easily attaching trolley bracket 20. Any reference board 15r is supported at the same vertical height as track boards 15 and has a matching grid that stays in horizontal alignment as the reference board overrides the track boards. The vertical edges of module boards 15 are preferably unframed so that their grid patterns extend to their vertical side edges. This allows the boards to abut against each other without interrupting the grid pattern and it makes the grid pattern easier to read as it extends from one board to the next. It also makes reference board 15r easier to read relative to track boards 15, because no visually interruptive frame is interposed between the movable information on the reference board and the stationary information on the underlying track-supported boards.

My overrider system also cooperates conveniently with some simple accessories as shown in FIGS. 5-8.

A flexible index file 20 as shown in FIGS. 1 and 5 adapts a conventional card index file to the overrider system. Pivotally mounted, transparent card holders shingled out in a vertical array are mounted on a flexible ferromagnetic backing sheet 31 that can bend over frame channels 16 and 26 and tracks 11 and 12 and still support the card holders securely. Flexible card index 30 can be magnetically mounted on an index supporting board 15i that is faced with magnetic material for holding the flexible metal backing 31 of index file 30. Support board 15i can also be mounted on trolley bracket 20 so that index 30 can be used as an overriding reference movable along the length of the scheduling board system. The upper end of index 30 extends above upper track 12 as permitted by flexible backing 31 so that the uppermost visible line of the card index can be aligned with the uppermost grid lines of the track-supported boards 15.

Figure 6:
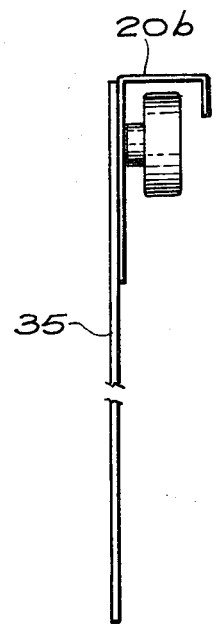
FIG. 6 is a fragmentary side elevational view of a trolley bracket and reference bar usable in the inventive overrider system.
Figure 7:
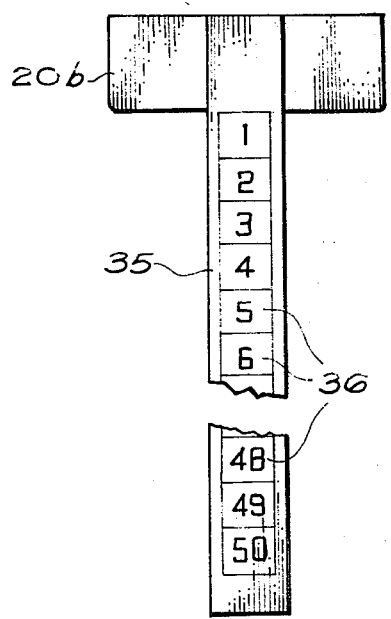
FIG. 7 is a fragmentary front elevational view of the reference bar of FIG. 6.

An overriding reference element can be formed as a simple vertical bar 35 as shown in FIGS. 6 and 7. It typically carries a numerical index 36 as illustrated and can be permanently attached to a trolley bracket 20b formed in the same way as previously described trolley bracket 20 except lacking holder tabs 25 and being permanently attached to vertical bar 35. Bar 35 extends down to the level of spacer lip 27 on lower track 11 so it is held clear of track boards 15 in the same way as previously described.

Figure 8:
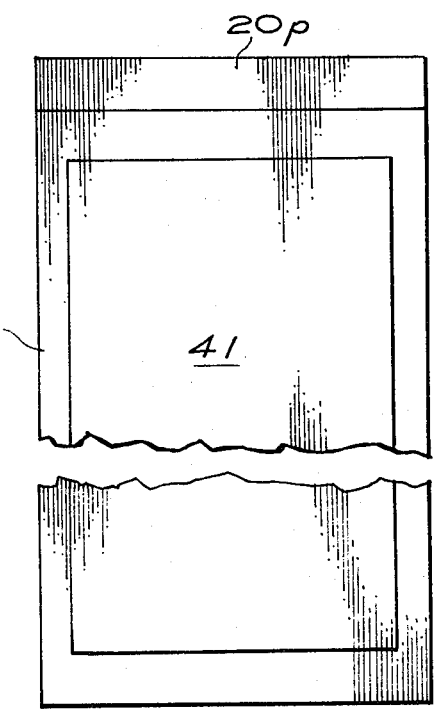
FIG. 8 is a fragmentary front elevational view of a trolley-mounted reference panel usable with the inventive overrider system.

Another convenient reference overrider is a vertical panel 14 that is preferably about five inches wide and provided with a blank writing surface 41. It can have an upper frame element 26 for attachment to a standard trolley bracket 20 or it can be permanently attached to its individual and similar trolley bracket 20p as shown in FIG. 8. Marking surface 41 of panel 40 allows write-on and wipe-off note taking so that it can be moved along the length of the track-supported boards 15 to make notes relative to the displayed information. These notes can be wiped off and changed at any time.

A single system can include several trolley brackets 20 in different lengths to support different widths of modular panels 15, and can also include flexible index 30, reference bar 35, and reference panel 40, if all these are desired. Module boards can interchange between being track-supported and mounted on a trolley bracket to serve as a reference element, and the interaction between the different possible overrider reference elements and the underlying module boards makes the system versatile and adaptable to a wide variety of scheduling and information display circumstances.

I claim:

1. In a modular scheduling board system having upper and lower wall tracks vertically spaced to support movable module boards that rest on the lower track and are removably retained in a vertical position by the upper track, a movable overrider system for moving a reference element over the front faces of said track supported module boards, said overrider system comprising:
   a. a generally vertically oriented trolley bracket;
   b. a pair of wheels mounted on and spaced from said trolley bracket;
   c. a smooth path for receiving said wheels, said path being formed along an upper forward surface of said upper wall track;
   d. a retainer lip extending upward along the front edge of said upper track;
   e. said retainer lip being arranged to extend into the space between said wheels and said trolley bracket when said wheels are on said path so that said wheels engage said retainer lip and rest on said path to support said trolley bracket for rolling along said upper track while extending downward over the front face of said upper track;
   f. a holder formed on the lower edge of said trolley bracket to engage the back of one of said module boards selected to serve as said reference element and to hold said reference element board to hang downward from said trolley bracket;
   g. said holder and bracket being dimensioned to suspend said reference board at the same vertical level as said track supported boards; and
   h. said lower wall track having a lip extending forward along its upper forward edge to engage the back of said trolley supported reference board and space said reference board clear of the fronts of said track supported boards so that said reference board can be moved along the length of said tracks to override said track supported boards while staying in horizontal alignment with said track supported boards.

2. The system of claim 1 wherein each of said module boards has a frame channel extending along its upper edge and said holder on said trolley bracket slides up under the back of said channel so that any one of said module boards can serve as said reference board.

3. The system of claim 1 wherein said module boards bear a grid pattern that extends to vertical side edges of said module boards which are formed to abut against each other without interrupting said grid pattern.

4. The system of claim 1 including another one of said trolley brackets mounting said spaced wheels to roll along said wheel path against said retainer lip on said upper track, said other trolley bracket carrying a vertically oriented bar that extends down to said spacer lip on said lower track and serves as said reference element so said bar is movable over said track supported module boards.

5. The system of claim 1 including another one of said trolley brackets mounting said spaced wheels to roll along said wheel path against said retainer lip on said upper track, said other trolley bracket carrying a vertically oriented panel that extends down to said spacer lip on said lower track and serves as said reference element so said panel is movable over said track supported module boards.

6. The system of claim 1 including a visible card index arranged on a flexible backing material for mounting vertically between said tracks and flexibly extending over said tracks.

* * * * *